March 5, 1963 N. G. E. STEMME ET AL 3,080,552

MEMORY DEVICE

Filed Oct. 14, 1958 6 Sheets-Sheet 1

March 5, 1963 N. G. E. STEMME ET AL 3,080,552

MEMORY DEVICE

Filed Oct. 14, 1958 6 Sheets-Sheet 2

March 5, 1963 N. G. E. STEMME ET AL 3,080,552

MEMORY DEVICE

Filed Oct. 14, 1958 6 Sheets-Sheet 3

March 5, 1963 N. G. E. STEMME ET AL 3,080,552

MEMORY DEVICE

Filed Oct. 14, 1958 6 Sheets-Sheet 5

March 5, 1963 N. G. E. STEMME ET AL 3,080,552

MEMORY DEVICE

Filed Oct. 14, 1958 6 Sheets-Sheet 6

United States Patent Office 3,080,552
Patented Mar. 5, 1963

3,080,552
MEMORY DEVICE

Nils Gustaf Erik Stemme, Nasbypark, and Sven Erik Wahlström, Enskede, Sweden, assignors to Aktiebolaget Atvidabergs Industrier, Atvidaberg, Sweden, a joint-stock company of Sweden Filed Oct. 14, 1958, Ser. No. 767,169
11 Claims. (Cl. 340—174.1)

The invention relates to a memory device in which information or data are stored on tapes containing or covered with a magnetic or ferroelectric material.

Many various types of magnetic or ferroelectric memory devices are known already. As an example of magnetic memory devices may be mentioned the usual magnetic drum memory device comprising a drum preferably consisting of brass covered with magnetic material in which information can be stored. Such drum memories have a short access time but require much space in relation to their capacity.

It was recently tried to modify such magnetic drum memories in order to increase the capacity in relation to the space requirement of the modified device. For this purpose, the drum was divided into a large number of thin, parallel discs the one side of which was covered with a recording medium. In principle, the surface of the drum was thus replaced with a large number of circular surfaces having the same diameter as the drum. As, however, owing to the very high accuracy required, this modification entailed almost insurmountable constructive difficulties, it cannot be considered a perfect solution. Magnetic memory devices may further consist of core or ferrite memories, comprising preferably toroid-shaped magnet cores (ferrites) arranged in a two- or three-dimensional matrix. Also in the case of these devices the access time is short but the space requirement in relation to the capacity is very high.

There are also electrostatic or "ferroelectric" memory devices available which in principle show the same constructional design as the magnetic memory devices mentioned above, with the modification that the ferrite cores are replaced with so-called ferroelectric capacitors. The disadvantages and deficiencies of these memories are on the whole the same as those of the core memories. There are further tape memory devices available which, for example, comprise plastic tapes covered with or containing magnetic (or in certain cases possibly ferroelectric) material. As such tapes may have a length of several thousands of meters, their access time is usually relatively long and may average 15 minutes. The space requirement of these tape memories, however, in relation to their capacity is very small.

It is a primary object of the invention to provide a memory device which combines the advantages of the aforementioned devices without showing their shortcomings.

It is thus the aim of the invention to provide a binary memory device of simple and cheap design which combines an extremely short access time with a large capacity relative to its space requirement.

Therefore, the memory device according to the invention is particularly characterized in that it comprises a plurality of rotatable coils on each of which such tape is wound, said coils being disposed on a common movable carrier by means of which all coils, possibly after their translatory motion in relation to the carrier, can be adjusted in a coiling and uncoiling position to cooperate with a coiling and uncoiling mechanism comprising drive means for winding the tape on and off the coil, and recording and analyzing means past which the tape of the respective coil can move when the coil is in its winding or coiling and un-coiling position.

In an embodiment of the invention the carrier has the shape of a disc rotatably mounted on a horizontal shaft and being connected to drive means for the disc, the coils being disposed in circular rows concentric with the horizontal shaft, their axes of rotation being parallel to the shaft, all coils being movable to the winding position by correspondingly turning the disc.

In an alternative embodiment of the invention the coils are disposed on an essentially vertical plate which is translatory movable in two coordinate directions perpendicularly to each other, in such a way that any coil may be positioned in a starting position from which it can be transferred into winding position by means of a translatory motion imparted by an advancing mechanism, the motion being perpendicular to the plane determined by the two coordinate directions.

In order to be able when the tape is being wound on one coil in the memory device to start reading at the same time from a tape on another coil, two memory devices are preferably combined in pairs. A complete apparatus may comprise any suitable number of pairs of memory devices.

An address in the memory device comprises preferably one digit indicating which pair of memory devices is desired, two digits indicating which two coils of the selected pair are desired, and four digits indicating to which block of the tape the reference is directed. The last of these digits being odd, it is referred to the one memory device, and being even, to the other memory device of the pair. A reference to the memory may mean either that something should be recorded or read out.

These two embodiments will now be described more explicitly in the form of non-limiting examples, reference being had to the accompanying drawings. The tape of the coils is assumed to be covered with magnetizable material. Naturally, the tape could instead have been covered with ferroelectric material, the detail of modifications of the memory device required for this purpose not demanding any further information in order to be obvious to a person skilled in the art.

Figure 1:
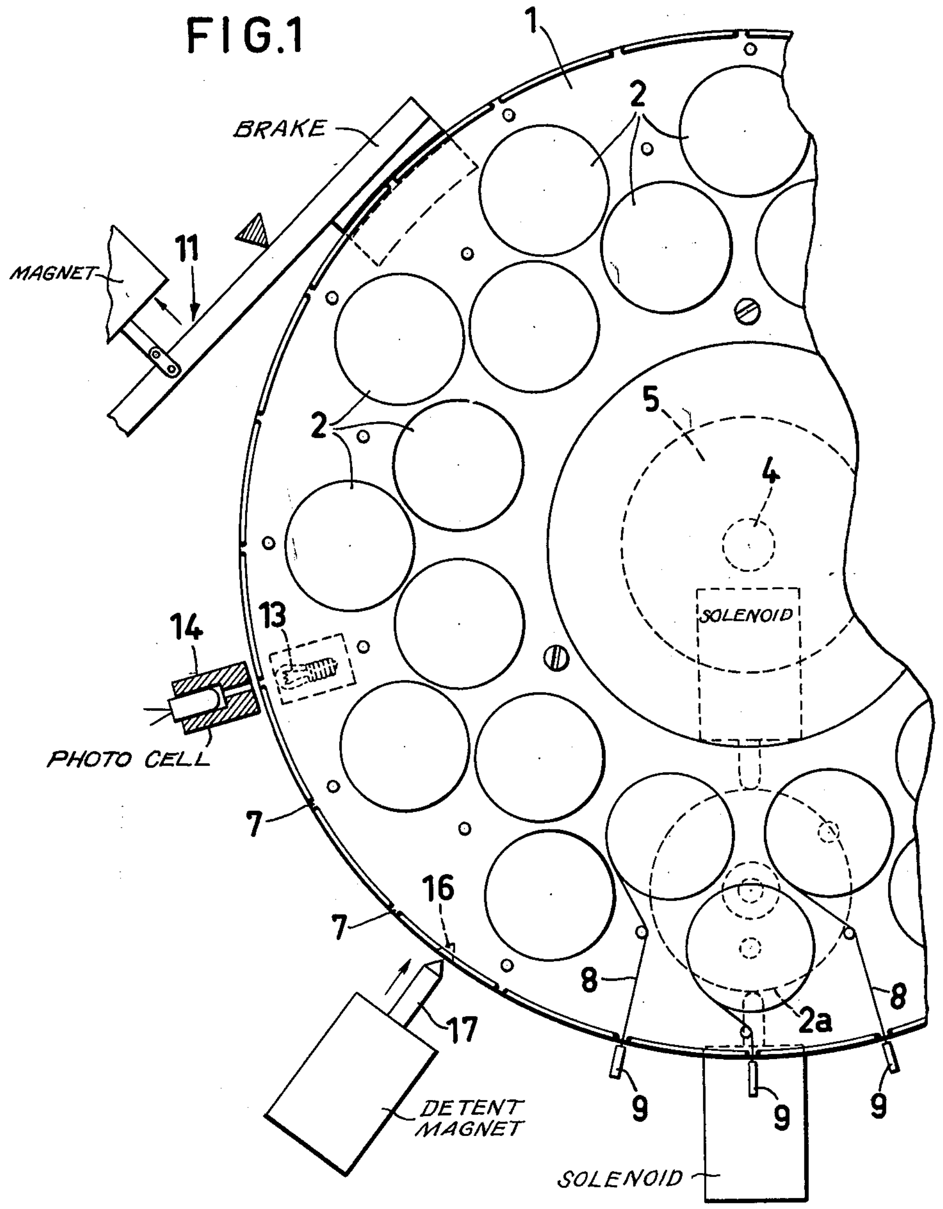
FIG. 1 is a partially schematic plan view partially in section of a first embodiment of the invention.
Figure 2:
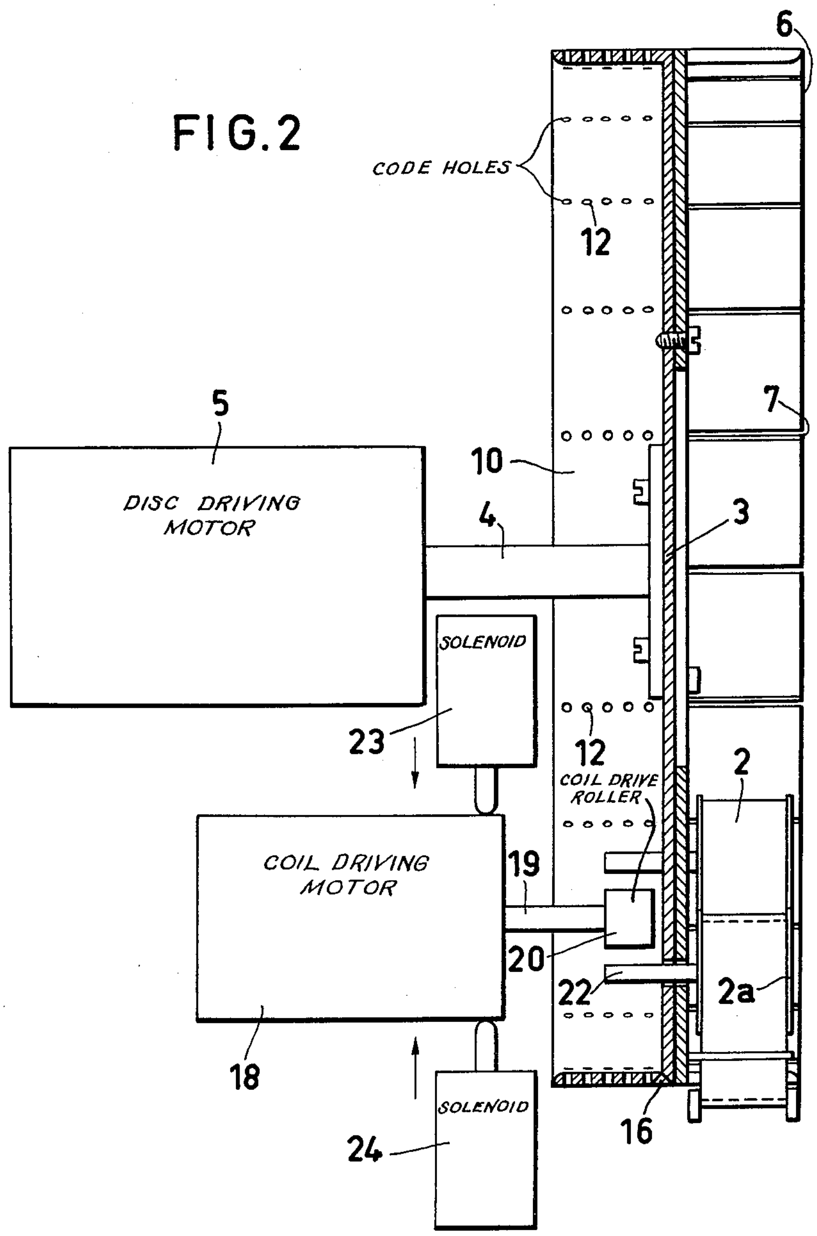
FIG. 2 is a partially schematic side view partially in section of the device of FIG. 1.

The embodiment shown schematically in FIGS. 1 and 2 comprises a disc 1 on which a suitable number of coils 2 (24 coils in the embodiment shown) are disposed in two concentric circles, said disc being secured on a second disc 3 which is mounted on a horizontal shaft 4 which by means of a suitable transmission (not shown) is connected to a drive motor 5. The disc 1 is provided with a cylindrical flange 6 furnished with a number of slots 7 corresponding to the number of coils 2 through which slots the tape 8 of the coils 2 is directed. A weight is fastened to each end of the tape and has preferably the shape of a rectangular plate 9 the short sides of which project beyond the longitudinal edges of the tape 8. The weight 9 serves as a fixing means which by abutting against the flange 6 holds the free end of the tape 8 outside the flange 6 and prevents the tape 8 from becoming completely wound on the coil. Owing to the weight 9 the tape is kept stretched in vertical direction, the free end of the tape thus being guided downward when the coil is being rotated in winding off direction. An additional function of the weight 9 will be fully described below.

The disc 3 is provided with a cylindrical flange 10 cooperating with a magnetic brake 11 and is furnished with rows or series of holes 12 arranged in code form and cooperating with an optic indicator comprising a light source 13 and a photoelecric cell 14. In the flange 10 are further disposed recesses or indentations 16 corresponding in number to the number of coils 2 and cooperating with a control pin 17, said recesses having the purpose of fixing the unit comprising the two discs 1 and 3 and the attached flanges 6 and 10 respectively as well as the coils 2, hereinafter called "carousel," in the adjustment positions selected.

As appears particularly from FIG. 2, there is also provided a motor 18 the shaft 19 of which is by means of a suitable transmission (not shown) connected to a drive pulley 20. Said pulley can be forced into friction engagement with the shaft 22 of the coil $2a$ being located in winding position, i.e. the lowermost possible position for a coil 2 in the respective coil circles. In the embodiment shown the displacement of the pulley 20 for engaging with a coil shaft in the inner and outer coil circle respectively is shown as effected by two solenoids 23, 24 for the coils in the outer and inner circle respectively. The motor 5 renders it thus possible to locate any coil 2 in winding position, and by means of the motor 18 and the pulley 20 it is possible to wind with suitable speed the tape 8 on and off the coil $2a$ occupying winding position.

In principle, the selection proceeds as follows:

(1) If the address selected to which a reference is directed, corresponds to the number of the carousel, the number of the coil desired is compared to the number of that coil which is just in starting position for winding. The coils being located on the outer circle are assumed having odd numbers, while the coils on the inner circle have even numbers. If the numbers are not in agreement, it is tested which will be the shortest rotation way for the carousel for locating the desired coil in winding position.

(2) By means of the motor 5 the carousel is then rotated in the indicated direction until through the optic indicator 13, 14 in cooperation with the code hole groups 12 the desired coil $2a$ is signalled approaching winding position.

At this, the proceeding is as follows:

*a.* The drive motor 5 is disconnected from the carousel.
*b.* The magnet brake 11 is connected and after having effected a relatively soft braking of the carousel, again disconnected.
*c.* The preferably magnetic control pin 17 moves into its conical recess 16. After disconnection of the brake 11 the control pin 17 acts upon the carousel in such a way that the final standstill position of the carousel is exactly defined.

(3) If, for example, the selected coil has an odd number, the motor 18 with the driving shaft 19 is moved downward so that the pulley 20 is pressed against the coil shaft 22. If, however, the selected coil has an even number, the motor 18 with the driving shaft 19 is by the solenoid 24 moved upward so that the pulley 20 is pressed against a coil shaft in the inner circle.

(4) The subsequent "winding process" will be described below in connection with the winding mechanism.

(5) When after completion of the winding the coil $2a$ has come to rest, the tape 8 being wound on, the weight 9 abutting against its stop formed by the flange 6, and the pulley 20 being disconnected, another coil 2 of the same or a different carousel may be selected.

Figure 3:
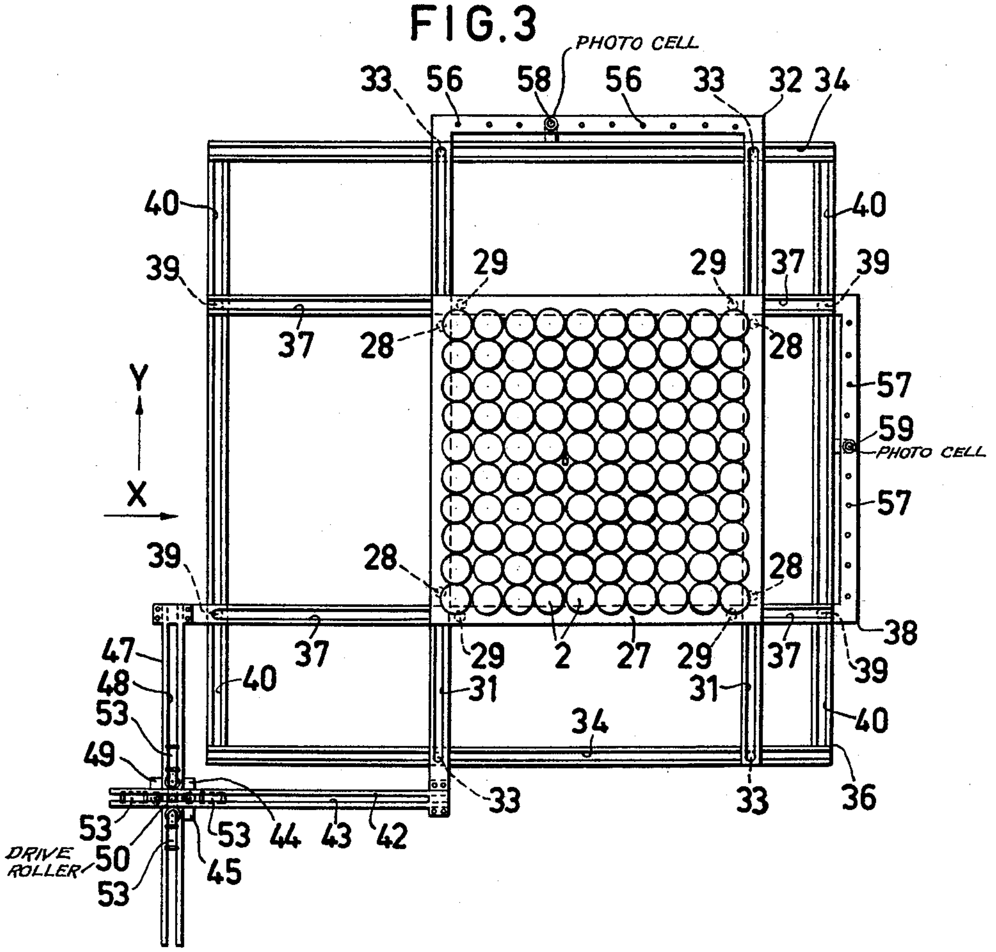
FIG. 3 is a partially schematic plan view of an alternative embodiment of the invention.
Figure 4:
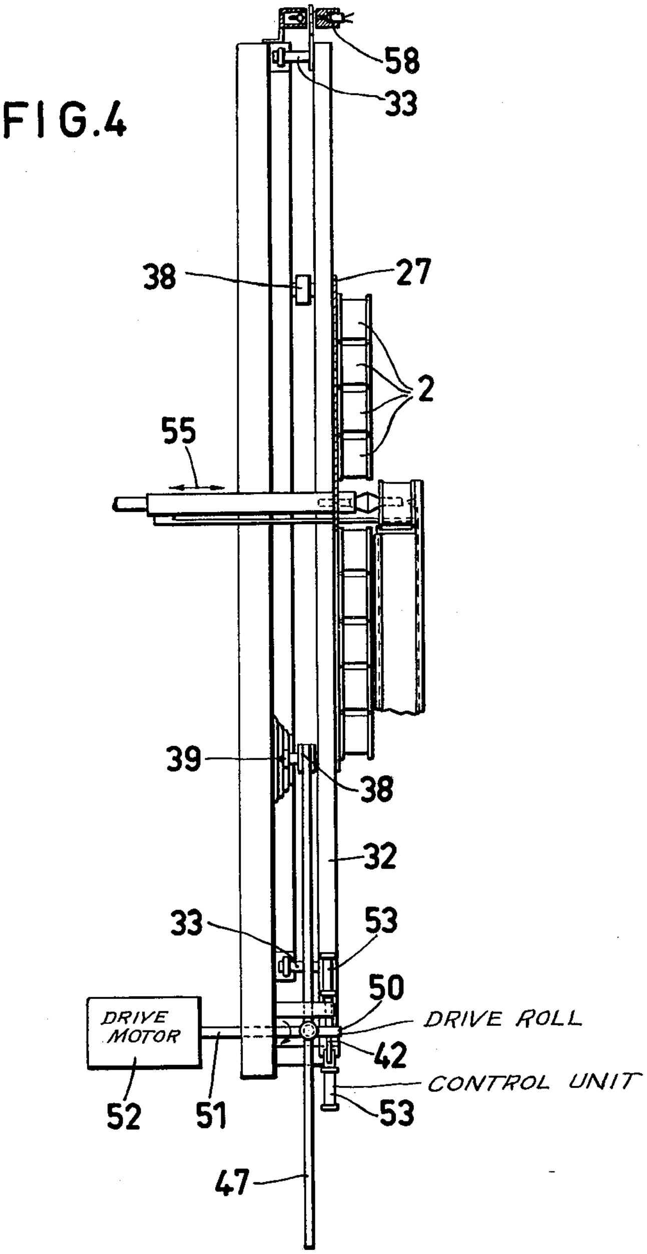
FIG. 4 is a partially schematic side view, partially in section, of the device of FIG. 3.
Figure 5:
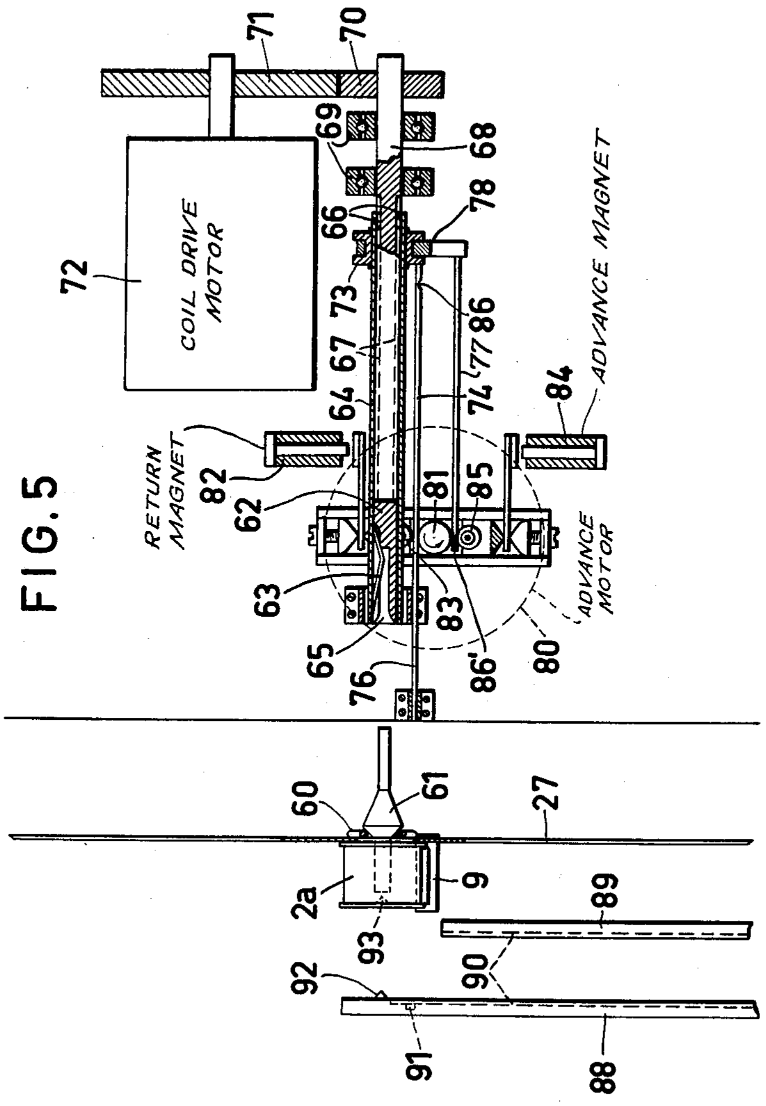
FIG. 5 is a side view partially in section of an advance mechanism used for displacement of the coils disposed on the plate in FIGS. 3 and 4.

In FIGS. 3 and 4 another device is shown which renders it possible to adjust a selected coil in a starting position in which it by means of the advance mechanism shown in FIG. 5 can be displaced into winding position. According to FIGS. 3 and 4 the coils 2 are disposed in a two-dimensional matrix on plate 27. In the embodiment shown the matrix comprises ten horizontal rows running in the X-direction and ten vertical columns running in the Y-direction. The matrix thus comprises a total of one hundred coils. In the plate there are disposed four pins or other type of control means 28 and four analogous pins or control means 29. Said pins 28 cooperate with and are displaceable in slots 31 which are provided in the long sides running in the Y-direction of a rectangular frame 32 in which, as shown in FIG. 3, one of the short sides may possibly be lacking. Pins 33 or other control means being furnished in the frame 32 are preferably located at the ends of the slots 37. The pins 39 cooperate with and move in slots 40 running in the Y-direction in the square frame 36. The rectangular frame 32 is connected to a rail 42 provided with a slot 43 running in the X-direction, and extending between two fixed blocks, nuts or the like 44 and 45. A rail 47 is in the same way connected to the rectangular frame 38. Said rail 47 which is provided with slots 48 running in the Y-direction crosses the rail 42 and extends between the block 44 and a second fixed block 49.

In the point of intersection between the slots 43 and 48 of the rails 42 and 47 a drive roll 50 is located which via a transmission shown in the form of a shaft 51 is connected to a drive motor 52. Said drive roll 50 can by means of the schematically shown control unit 53 be forced to get selectively into frictional engagement with either of two in relation to the drive roll diametrically opposite located points of the slots 43 and 48, and through its rotation drive the frames 32, 38 respectively and thereby the plate 27 and the coils 2 in the X- and Y-direction respectively until the selected coil is brought into the starting position from which it is advanced into winding position by means of an advance mechanism which will be described below in connection with FIG. 5 and of which a portion is schematically shown at 55 in FIG. 4.

Each of the rails 42 and 47 cooperates with a preferably electromagnetic brake (not shown) which, for example, can stop the rails through pressing them against the fixed blocks 44, 45, 49. The two frames 32, 38 are also here provided with groups of holes 56 and 57 respectively, which in FIG. 3 are indicated through only one hole per group and in which groups the holes are arranged according to a certain code. The hole groups 56 and 57 which correspond to the hole groups 12 of the embodiment according to FIGS. 1 and 2, cooperate with optic indicators 58 and 59 respectively which together with the hole groups indicate when a selected coil gets into starting position.

The indicated drive means for the frames 32 and 38 and for the plate 27 can be alternatively replaced with hydraulic or pneumatic drive means comprising a pressure cylinder which is provided with a row of outlet apertures and constantly supplied with a pressure medium. In said cylinder a movable piston controls the motions of the rectangular frames 32, 38 respectively, the position of said piston being determined through selectively opening one of the outlet apertures in the pressure cylinder. In this embodiment no hole groups 56 and 57 and no optic indicators 58 and 59 are required.

The advancing mechanism 55 by means of which a coil is moved from starting position into winding position, is shown in FIG. 5. To the left of FIG. 5 a coil $2a$ is shown in starting position, said coil being supported on the plate 27 by means of a coil shaft 61 and a suspension spring 60. The coil shaft 61 cooperates with a winding socket 62 provided with arresting springs 63 and a conical opening 65. Said winding socket 62 is rigidly connected to a tube 64 in which a pair of wedges 66 is mounted to slide in the groove 67 of a shaft 68 which is mounted on ball bearings 69 and via gear wheels 70, 71 driven by a drive motor 72 of a winding mechanism (described later) for winding on and off the tape being wound on the coil 2*a*. With the tube 64 is rotatably but not displaceably connected a socket 73 in which an advance yoke 74 is provided the front end of which is shaped as a control fork 76 cooperating with the tape. Via an intermediate member 78 also a return yoke 77 is rigidly connected to the socket 73. The advance mechanism comprises furthermore an advance motor 80 driving an advance roller 81 which can be forced to engage selectively with the advance yoke 74 and return yoke 77 respectively. The means provided for this purpose are preferably formed by an advance magnet 82 which for advancing presses the advance yoke 74 via a stop roll 83 against the drive roller 81, and a return magnet 84 which for returning presses the return yoke 77 via a second stop roll 85 against the drive roller 81. In order not to stress the motor 80 unnecessarily, the advance and return yokes respectively are on their ends provided with recesses 86 and 86′ respectively so that they can run free from the drive roller 81.

Figure 6:
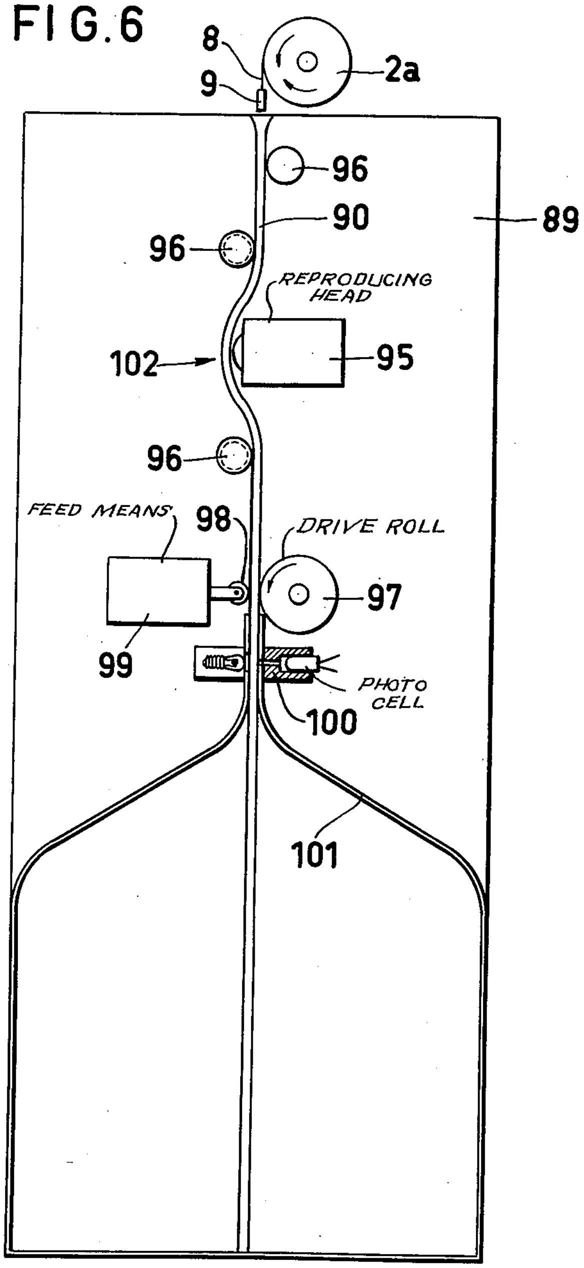
FIG. 6 is a partially schematic side view partially in section of a winding mechanism used for both the first and the alternative embodiments of the invention.

To the left of FIG. 5 is shown the upper portion of the walls 88 and 89 of the container for the tape wound off, said container being part of the winding mechanism. Each of the walls 88 and 89 is provided with a pilot channel 90, more clearly shown in FIG. 6 and cooperating with the weight 9. The wall 88 is somewhat longer than the wall 89 and provided with a recess 91 for the free ends of the control fork 76 and preferably also with a conical pin 92 purposed to engage with a corresponding conical recess 93 on the coil 2*a* in order to improve the bearing of said coil.

When selecting a coil, the embodiment according to FIGS. 3–5 operates in principle in the following manner:

(1) One digit of an address indicates the position in the X-direction, and another digit the position in the Y-direction. In the same way as with the carousel selector the actual value is compared to the desired value in the X- and Y-directions in order to determine the directions of motion for the frames 32 and 38.

(2) Thereafter, the frames 32 and 38 displacing the coil plate 27 in the X- and Y-direction respectively move independently of each other in the directions indicated until the optic indicators 58 and 59 signal that the desired position is almost reached and that the selected coil 2*a* will just assume starting position.

At this, the proceeding is as follows:

*a*. The driving of the rectangular frame approaching its determined position is stopped.
*b*. The magnetic brake for this frame is energized and blocks the frame.
*c*. "Ready"-signal is given to an indicator circuit from which a ready signal is given when ready signals have been received from both frames.

(3) After ready was signalled from the indicator circuit according to 2.*c* above, the advance mechanism 55 is started whereby the following occurs:

*a*. The electromagnet 82 for advancing is energized.
*b*. The advance yoke 74 with the control fork moves to the left and brings with it the winding socket 62.
*c*. The conical opening 65 of the winding socket 62 takes up the coil shaft 61, and the socket is pushed on the shaft until the friction force from the springs 63 in the winding socket 62 is balanced by the force of the suspension springs 60 of the coil.
*d*. Simultaneously with *c* the legs of the control fork 76 embrace the tape above the weight 9.
*e*. After the final moment of *c* the coil 2*a* disengages from its attachment to the plate 27 and is thereafter held only by the winding socket 62.
*f*. The coil 2*a* is now moved on until the conical recess 93 in the end of the coil is taken up by the likewise conical pin 92 on the outer wall 88 of the winding mechanism. Owing to the counterpressure of this pin, the winding socket 62 is pressed so far on the coil shaft 61 that the knee of the springs 63 in the winding socket passes the end of the shaft. In this end position the ground-in recess 86 is located just before the drive roller 81 of the advance motor 80, with the effect that the advance motor 80 is free from load during the winding operation.

(4) Through starting the motor 72 which turns the winding socket 62, the winding operation is now commenced. The winding operation will be described below.

When the winding operation is completed, the advance mechanism is ordered to return the coil 2*a*. At this, the following occurs:

*a*. The return electromagnet 84 is energized.
*b*. The return yoke 77 moves to the right, the control fork 76 and the coil 2*a* thus also moving to the right at the same time. Owing to this, there is no risk for the weight 9 to jam in the pilot channel 90 or to interfere with the return movement.
*c*. When the catching position of the coil shaft 61 gets into contact with the suspension spring 60, said spring will be forced aside owing to the considerably stronger spring force between the coil shaft 61 and the springs 63 in the winding socket so that the coil fork moves against the suspension plate 27.
*d*. When the coil is stopped by the suspension plate 27, the winding socket 62 is drawn off the coil shaft 61.
*e*. Simultaneously with the moment *d* the control fork 76 is drawn back from the tape and places thus the weight 9 into its correct position below the coil.

6. The return movement continues until the drive roller 81 of the advance motor 80 is placed just before the ground-in recess 86′ of the return yoke 77. At this, the friction engagement between the drive roller 81 and the return yoke 77 is finished and the advance mechanism 55 stops.

The winding mechanism mentioned above at various occasions is shown in FIG. 6. Besides the coil 2*a* with the tape 8 and the weight 9 the winding mechanism comprises the following main parts: A winding device for example the motor 18 of FIG. 2 or 72 of FIG. 5 with transmission for winding on and off the tape 8, a magnetic head 95, control pins 96, a drive roll 97 cooperating with a contact roll 98 and a feeding mechanism 99 for feeding the tape 8, an optical indicator 100, a container 101 for the tape wound off with pilot channels 90 in the walls 88, 89. On the tape 8 which is provided with transparent portions cooperating with the optical indicator 100, such combinations have been recorded in connection with the assembly of the parts mentioned above which indicate, for example, where the recording and writing can start and stop. When in the memory device a certain address is desired, the selector mechanism (carousel selector according to FIGS. 1–2, or matrix selector according to FIGS. 3–5) starts and positions the selected coil in winding position. The selection being completed, a ready signal is given from the selector mechanism, and the winding commences when the winding order was given or arrives.

In principle, the winding operation proceeds as follows:

(1) As the first moment of the winding operation a rotary motion from the motor 18 or 72 is transferred to the coil 2*a* so that the tape is wound off with a speed of $n_1$=700 r.p.m., the coil being driven by friction drive. The weight 9 at the end of the tape slides in its pilot channels 90 past the control pins 96 and the magnetic head 95 and intercepts the light ray in the optical indicator 100.

(2) Owing to the interception of the light ray in the optical indicator the following occurs:

*a.* The winding off of the tape 8 with the speed of $n_1$ r.p.m. is interrupted.
*b.* The contact roll 98 is by means of its advance mechanism 99 pressed against the drive roll 97 for feeding the tape 8.
*c.* A rotary motion with the speed of $n_2$ r.p.m. and in opposite direction to $n_1$ is via a friction coupling transferred to the shaft of the coil 2*a*.

The moments *b* and *c* are timed in such a way that *b* occurs somewhat earlier than *c*.

(3) The drive roll 97 now supplies the tape 8 from the coil 2*a* and advances it over the magnetic head 95 which is first connected for reading.

(4) After completion of the desired writing or reading or, at the latest, when so much of the tape 8 is wound off, that the last transparent portion of the tape passes the optical indicator 100, the winding mechanism is adjusted for winding on the tape, which means the following:

*a.* The advance mechanism 99 releases the contact roll 98 from the tape 8 and the drive roll 97.
*b.* The coil 2*a* which during the preceding stage (according to 2.*c*) was all the time acted upon by a friction moment in the winding on direction, starts rotating and winds the tape 8 on the coil 2*a*.

(5) If no reference is given to the tape 8 when it is being wound on, the winding on proceeds and the following occurs:

*a.* When so much tape 8 is wound on that the tape stretches and the weight 9 gets free from the bottom of the container 101 with the pilot channels 90, the speed of the coil 2*a* is first slightly decreased.
*b.* When the weight 9 passes the optical indicator 100, an impulse for disconnecting the driving of the coil 2*a* is given.
*c.* The tape 8 continues in getting wound on, and the weight 9 is somewhat slowed down when passing the curved portion 102 of the pilot channels 90. Thereafter the weight moves on toward a stop (for example the control fork 76 of FIG. 5 cooperating with the recess 91). The rotational moment of the friction coupling (for example between the springs 63 in the winding socket 62 and the coil shaft 61) driving the coil 2*a* is not so great that the tape 8 can stand well the static braking. Besides the static braking the tape should also withstand the forces caused by the rotational inertia of the coil 2*a*. Owing to the relatively loose winding of the tape during the first phase of winding on, some stretching may occur in the final phase so that the braking goes relatively smooth.
*d.* At about the same time as the weight 9 arrives at the stop 76, the drive of the coil is completely disconnected.

(6) If during the moment 4*b* a new reference is given to the same tape 2*a* in the memory, the winding mechanism will be energized again. Everything is all right if the desired address on the tape is located on that portion of the tape which is already wound on. But, if it should happen that the address desired is located on that tape portion which is below the head 95, the tape 8 will be wound off to its end without showing the address, must then be wound on again, and again be wound off until the desired address is found. Owing to the fact that the speed of winding on the tape is much greater than that of winding off, and further that in many cases the selection of an address can be arranged in such a way that after a reference was given to one address, the next reference is given to the same address or to some address further in to the tape (address with higher number) it is highly probable that when the reference is given to the same tape, the address will be found relatively quickly. In order to keep the access time short, for example when the contents of an optional portion of the memory is being read out, the tape 8 on each coil 2 should be not too long, preferably 7 m. The density of storing may be 15 characters per mm., so that each tape comprises about $10^5$ characters. In the carousel alternative according to FIGS. 1 and 2 the total memory capacity (of 24 coils) is about $2{,}4.10^6$ characters. A pair of cooperating carousel selectors has, consequently, a joint capacity of $4{,}8.10^6$ characters.

The total capacity of a pair of matrix selectors with 10 x 10 coils according to FIGS. 3–4 will in a corresponding manner be about $20\times10^6$ characters.

It appears from the above description that through the present invention we have provided a memory device which combines a very large memory capacity with a small space requirement, and where from any part of the memory information can be read out very quickly.

Although in the above description of the invention only magnetic tape and magnetic analyzing devices are referred to, it will be immediately obvious to any person skilled in the art that the invention also comprises, for example, electrostatic memories in which information is accumulated on ferroelectric tape, in which case, of course, the magnet heads are replaced with corresponding electrostatic analyzers. The memory device according to the invention offers the highly important advantage that any coil 2 of the coil plates 1 and 27 may be taken away and, if desired, replaced with another coil. Moreover, by one movement of a hand the coil plates including the attached coils may be taken away as complete units.

The embodiments described and shown are, of course, to be considered only examples the details of which can be modified in various ways within the scope of the following claims. Instead of one single winding mechanism for each carousel or matrix selector, there may be, for example, two or more winding mechanisms. Furthermore, within the scope of the inventive idea new embodiments may be created through the combination of various details of both embodiments shown or by replacing some detail arrangements for carrying out a certain function with equivalent arrangements by means of which the same function can be carried out.

What we claim is:

1. In a random access storage device, a plurality of planar spirally wound coils of record medium, a carrier rotatable on a fixed axis, means rotatably mounting each said coil on said carrier in fixed spatial relationship with respect to each other coil, means for rotating said carrier to move a selected one of said plurality of coils to a predetermined position and means for rotating said selected coil while in said predetermined position.

2. In a random access storage device, a plurality of spirally wound coils of record medium, a rotatable carrier, means rotatably mounting said coils on said carrier in fixed spatial relationship with respect to each other, means for rotating said carrier to move a selected one of said plurality of coils to a predetermined position, means for rotating said selected coil while in said predetermined position, said coil rotating means serving to wind and unwind the record medium from said selected coil, and means responsive to said record medium as it is unwound to provide an indication of the information on said record media.

3. In a random access storage device, in combination, a plurality of coils, each comprising a number of turns of a tape shaped record medium, each of said coils being rotatably mounted on one of a plurality of non-coaxial shafts placed side by side on a common movable carrier, means for moving said carrier in a plane substantially perpendicular to the axis of said coils to position a selected coil in a substantially fixed winding position, fixed means for winding the tape on and off a coil occupying said winding position, fixed means for reproducing and recording information on the tape, fixed guiding means for guiding the outer free end of tape of a selected coil past said recording and reproducing means, and means for driving the tape at a controlled speed past said reproducing and recording means.

4. A storage device as claimed in claim 3, wherein said means for moving said carrier comprises means operable in two perpendicular directions in said plane, said movement bringing a selected coil into a starting position and wherein means are provided for displacing a coil from starting position in a direction parallel to its own axis to the winding position.

5. A storage device according to claim 4, wherein the means for imparting translatory movement to said common carrier comprises an essentially square frame, the sides of which are provided with longitudinal slots extending parallel to the adjacent sides of the square; at least three sides of a first essentially rectangular frame having a rail extending parallel to one of the sides of said square rigidly connected thereto, the long side of said rectangular frame being provided with slots extending parallel to a side of said square perpendicular to said one side of the square, said slots having at the ends thereof guide means disposed in said rectangular frame, said pins engaging and cooperating with said slots of the square frame running parallel to said first side of said square; at least three sides of a second substantially rectangular frame with which a rail member extending and displaceable in a direction parallel to said second mentioned side of said square is rigidly connected, the long sides of said second frame being provided with slots running in a direction parallel to the first mentioned side of the square, guide means at the ends of said slots, said guide means being mounted on said last mentioned rectangular frame, said guide means engaging and cooperating with slots of the square frame extending parallel to the second mentioned side of said square; control means disposed in said common carrier, said control means engaging and cooperating with the slots extending parallel to the first and second mentioned sides of said square in said two rectangular frames whereby the said common carrier is caused to move with said rectangular frames parallel to adjacent sides of said square respectively; and drive means for effecting the displacement of said two rails.

6. A storage device as claimed in claim 3, wherein the free end of the tape of each coil is provided with a weight, said weight preferably being a rectangular shaped plate, the short edges of which project beyond the longitudinal edges of the plate and wherein a track is provided extending past said recording and reproducing means, said rectangular weight riding in said track to thereby lead the tape past said reproducing and recording means.

7. A device as claimed in claim 3 wherein a stationary container is provided, said container serving to collect the tape wound off the coil.

8. A storage device as claimed in claim 3, wherein said carrier comprises a disc mounted on a shaft parallel to the coil axes, said coils being arranged in at least one circular path around said shaft, and wherein said means for moving said carrier comprises means for rotating said disc around the shaft to position any selected coil in the winding position.

9. A storage device as claimed in claim 8, wherein code means are provided for indicating the angular position of the disc and wherein a control member is actuated by the code indication and locks the disc in position corresponding to the coil address supplied to the device.

10. A storage device as claimed in claim 9 wherein said control member includes a solenoid operated pawl mechanism cooperating with a magnetic brake.

11. A storage device as claimed in claim 8, wherein the coils are arranged in two concentric circular paths having the same number of coils therein and the coils of the inner path are displaced half a coil spacing in the circumferential direction with respect to the coils of the outer path.

References Cited in the file of this patent

UNITED STATES PATENTS

| | | |
|---|---|---|
| 2,821,576 | Gaubert | Jan. 28, 1958 |
| 2,852,761 | Hagopian | Sept. 16, 1958 |